May 23, 1961 F. PILTZ 2,985,010
SHAFT VIBRATION RESPONSIVE APPARATUS
Filed June 12, 1957
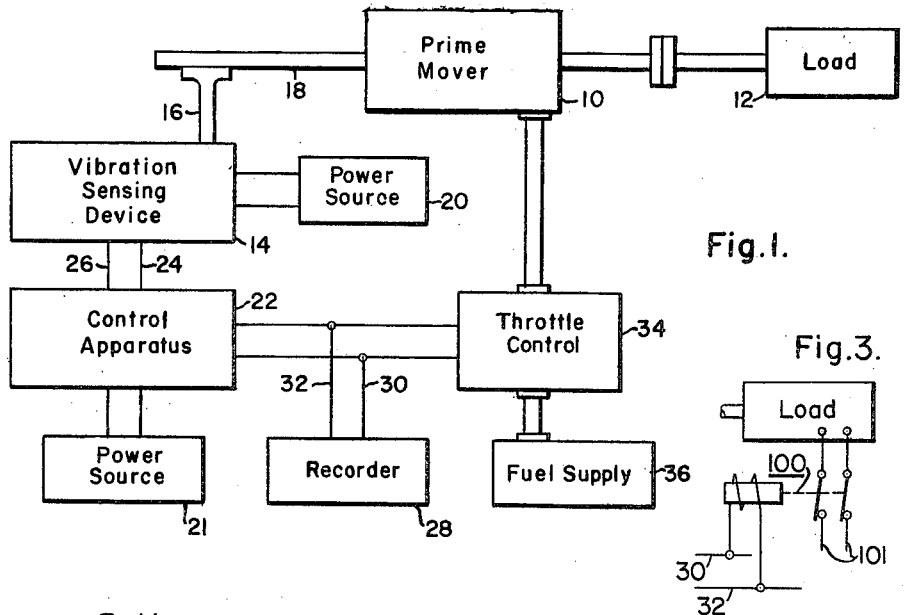
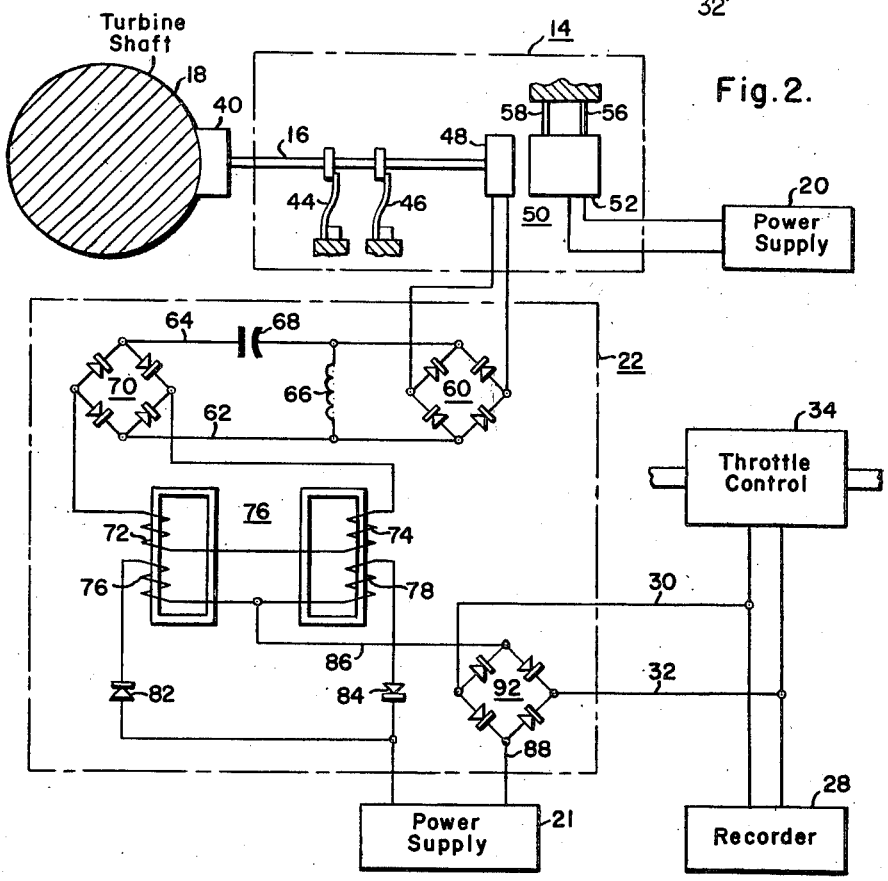

2,985,010
Patented May 23, 1961

2,985,010

SHAFT VIBRATION RESPONSIVE APPARATUS

Franklin Piltz, Catonsville, Md., assignor to Westinghouse Electric Corporation, East Pittsburgh, Pa., a corporation of Pennsylvania Filed June 12, 1957, Ser. No. 665,237

1 Claim. (Cl. 73—71.4)

The present invention relates in general to vibration or movement responsive apparatus, and more particularly to apparatus responsive to the vibration or transverse movement of an elongated shaft member, such as the rotating shaft member of a turbine or like device.

The prior art shaft vibration responsive apparatus for use in determining the transverse vibration of a rotating shaft of a steam turbine or like device utilizes a seismically mounted permanent magnet and a moving control signal providing coil as a sensing device, which latter coil is vibrated in synchronism with the vibration of the rotating shaft to provide a control signal which varies as a function of the shaft vibration amplitude and shaft rotational speed. However, the output control signal so obtained is weak and requires a considerable amount of amplification to provide sufficient power to operate an output device, such as a recorder or even a fuel supply control throttle for a prime mover such as a turbine to vary the operation of the prime mover as a predetermined function of the shaft vibration, for example, if the shaft vibration becomes too high in magnitude the operating speed of the prime mover may be desired to be decreased.

The required amplifying device for the prior art apparatus must of necessity utilize electronic tubes, and such tubes are subject to failure and conditions of inoperation that may be extremely costly relative for example to a prime mover such as a steam turbine costing several million dollars.

Accordingly, it is an object of the present invention to provide an improved vibration or movement responding appartus such as may be utilized for detecting transverse movement or vibration of the rotating elongated shaft member of a prime mover such as a turbine or like device.

It is another object of the present invention to provide an improved vibration or movement responding apparatus having a higher power output signal and being more sensitive in operation than prior art apparatus.

It is a further object of the present invention to provide improved shaft member vibration responding apparatus which provides an output voltage or signal that varies as a predetermined function of the shaft member vibration and is operative at a substantially greater power level.

It is a different object of the present invention to provide an improved shaft member vibration responding apparatus that is more flexible in operation regarding adjustment of output power as desired for subsequent utilization and is more accurate in sensing the shaft member vibration.

These and other objects and advantages of the present invention will become apparent in view of the following description taken in conjunction with the drawings wherein:

Figure 1 is a diagrammatic view of the vibration responsive apparatus in accordance with the present invention;

Fig. 2 is a schematic view showing the vibration control apparatus in accordance with the present invention; and Fig. 3 is a schematic showing of a modification of the apparatus of Figs. 1 and 2.

In Fig. 1, there is shown a prime mover or turbine 10, which may for example be a gas or steam turbine, operatively connected to a load device 12 for driving said load, which may be an electrical generator or like device. A vibration sensing device 14, including a contact arm member 16 which contacts and responds to the transverse vibration or movement of the shaft member 18 of the turbine 10 is provided. A first power source 20 having a first operative frequency, say 400 cycles per second, energizes the vibration sensing device 14 and a second power source 21 having a second and perhaps different frequency energizes the control apparatus 22. The output signal from the vibration sensing device 14 is applied through conductors 24 and 26 to the control apparatus 22 which in turn operates a recorder 28 through conductors 30 and 32. If desired, the control signal from the control apparatus 22 may be applied to a throttle control 34, which may comprise an electrically operative valve member, for controlling the supply of fuel or steam as the case may be to the prime mover 10 from a fuel or suitable supply 36.

In Fig. 2, there is shown an end view of the turbine shaft 18. The vibration sensing device 14 includes a shoe member 40 operative with the shaft or arm member 16 supported by leaf springs 44 and 46 such that the shaft 16 is moved in a direction toward the turbine shaft 18, wherein the shoe member 40 is in contact with the turbine shaft 18.

The secondary winding or coil 48 of a loosely coupled transformer 50 is carried by the opposite end of the support arm 16 and is movable with the support arm 16 and the shoe member 40. The primary winding 52 of the loosely coupled transformer 50 is supplied energy at a suitable frequency from a power supply 20. In this respect, for a turbine shaft 18 which may operate at a rotational speed in the order of 3600 r.p.m., the detected transverse vibration may be in the order of 60 cycles per second and a suitable operating frequency of the power supply 20 would be in the order of 400 cycles per second.

The leaf springs 44 and 46 may be operative to hold the shoe member 40 against the turbine shaft 18 at a contact pressure of about 8 pounds per square inch. The leaf springs 44 and 46 may be supported by a fixed portion of the turbine housing or case if desired.

The secondary winding 48 may comprise a thin pancake type of coil if desired, and the primary winding 52 is supported by flat leaf springs 56 and 58 from a suitable base member which may again comprise the housing or casing of the turbine 10. The leaf springs 56 and 58 are operative to seismically mount the primary coil 52, such that they have a resonant vibration in the order of 2 or 3 cycles per second, and above about 10 cycles per second there is no transmission of any vibration to the primary winding or coil 52. A voltage is induced in the secondary winding 48 which varies as a function of the vibration of the turbine shaft 18 as transmitted through the contact shoe member 40 to similarly vibrate the secondary coil 48 relative to the magnetic field set up by the stationary primary winding 52. This induced control signal or voltage from the secondary winding 48, including a 400 cycles per second base or carrier frequency component and a second modulation component that varies as a function of the vibration of shaft member 18, is rectified by a bridge type rectifier device 60 and is applied as a varying direct current voltage to the conductors 62 and 64. The inductor 66 and condenser 68 are operative as a low pass filter and direct current stripper for removing the 400 cycle per second base or carrier component of the control signal from the secondary winding 48 as well as the direct current component of such signal but allowing the alternating 60 cycle per second modulation or second component of the output signal, referenced to zero base, to pass through a second rectifier device 70.

It should be noted that the modulation component of the induced voltage in the secondary winding 48 is varied by varying the coupling coefficient of the transformer 50 to thereby vary the voltage induced in the secondary winding 48 by the magnetic field set up by the primary winding 52.

The rectified modulation component 60 cycle output signal from the rectifier device 70 is applied to the control windings 72 and 74 of a magnetic amplifier device 76 to thereby vary the impedance of the load windings 76 and 78 relative to alternating current from the second power supply 21. The rectifier devices 82 and 84 are well-known self-saturating rectifier devices, such that an alternating current signal is applied to the conductors 86 and 88 which varies as a function of the above modulation component or the vibration of the turbine shaft 18.

A recorder device 28 may be provided with a rectifying bridge circuit 92 being operative to change the alternating control signal in the conductors 86 and 88 into a direct current control signal as customarily required by the recorder device 28. The recorder device 28 is operative to provide a record of the vibrations of the turbine shaft 18 as may be desired. The latter control signal may also be applied to a throttle control device 34 as shown in Fig. 1 for controlling the supply of fuel to the turbine member 10 if the turbine member is a gas turbine or may be operative to control the supply of steam to a steam turbine. The second power supply 21 may be in the order of a 115 volt, 60 cycle per second power supply.

The control apparatus, in accordance with the subject invention, provides a higher power output signal than the prior art vibration responsive apparatus. In the prior art type of apparatus, the output control signal is limited by the low control voltage generated due to the movement of a coil within the field of a permanent magnet. In actual practice, a control signal in the order of 0.0625 volt R.M.S. across a 4500 ohm load at 3600 r.p.m. of the turbine shaft 18 may be obtained with the vibration being at a double amplitude displacement of .001 inch.

An integration device is usually required with the prior art apparatus in that the control signal is a function of velocity which in turn is a function of displacement and frequency. The integration device is operative to provide a desired control signal as a function of displacement only. However, the process of integration reduces the pickup output voltage available for amplification by a factor of 15 or so for any given displacement of the turbine shaft 18.

In accordance with the teachings of the present invention, the output power available from the secondary coil 48 depends upon the coefficient of coupling of the transformer 50 and can be made a substantially large value by placing the secondary winding 48 very close to the primary winding 52 and further by supplying the primary winding 52 with considerable power, for example, 100 watts.

If, for example, the power supply 20 supplies energy at 100 volts and 400 cycles per second to the primary winding 52, and a reasonable value of the coefficient of coupling is .1, then a base or carrier component signal of about 10 volts are induced in the secondary winding 48 for a 1:1 turns ratio. The vibration of the secondary winding 48 will change the coefficient of coupling and hence modulate the induced voltage as a function of the vibration of the turbine shaft 18.

Assuming a vibration of the secondary winding 48 of the order of .001 inch double amplitude produces a 1% change in the coefficient of coupling, the net modulation component of control voltage available from the secondary winding 48 would then be .01×10 or 1/10 volts R.M.S. This should be compared to the .0625 divided by 15 or .00415 volt available as a control signal from the prior art apparatus. Therefore, the control apparatus, according to the subject invention, represents an available output signal increase of .1 divided by .00415 or 24. The increase in power available is then 24×24 or 576 times the power available with the prior art type of apparatus.

It should be further noted that for the same percentage change due to the vibration of the secondary winding 48, the output power can be further increased by increasing the coefficient of coupling and by increasing the power input to the primary winding 52.

It should be still further noted that a force exists between the secondary winding 48 and the primary winding 52 due to the current flowing in these windings. This force is in such a direction to tend to move the seismically mounted primary winding 52 away from the secondary winding 48. As the primary winding 52 moves away, the force drops such that it is inherent in the control apparatus that the primary winding 52 will assume a stable and stationary position.

For the purpose of understanding the present invention, it should be noted that a rotating elongated member such as the shaft member 18 has an inertia axis, assuming perfect balance of the shaft member, a homogeneous structure and a symmetrical geometric shape. This inertia axis does not change in position so it makes a good reference for the measurement of shaft member transverse movement or vibration. A rotating body free in space rotates about its inertia axis as well known to persons skilled in this particular art.

Although the present invention has been described with a certain degree of particularity, it should be understood that the present disclosure has been made only by way of example, and that numerous changes in the details of construction and the combination and arrangement of parts may be resorted to without departing from the scope and spirit of the present invention. For example, as shown in Fig. 3 the control signal appearing in conductors 30 and 32 may be used for automatic control during starting or operation of a turbine in conjunction with a suitable control relay 100 or the like, to prevent the turbine and its load 12, if the latter load 12 comprises an electrical generator for a power distribution system, from being operative with the power lines 101 of the system if the shaft vibration is excessive or greater than predetermined limits of vibration.

I claim as my invention:

Vibration responsive apparatus comprising an alternating current source, signal-producing means having a primary winding connected to said source for alternating current energization and having an adjacent vibratorily moved secondary winding in which is induced an alternating signal including a source frequency component and a vibration frequency component, first full wave rectifier means at the output of said secondary winding transforming said alternating signal into a pulsating direct current signal, low pass filter and direct current stripper means removing from said pulsating direct current signal its source frequency and direct current components while passing the vibration frequency component as a source-frequency-free alternating vibration signal, second full wave rectifier means transforming said alternating vibration signal to a pulsating vibration signal, magnetic amplifier means responsive to said pulsating vibration signal to produce an amplified alternating current vibration-magnitude-indicating signal, third full wave rectifier means converting said alternating current vibration-magnitude-indicating signal to a pulsating direct current vibration-magnitude-indicating signal, and means responsive to said direct current vibration-magnitude-indicating signal.

References Cited in the file of this patent

UNITED STATES PATENTS

| | | |
|---|---|---|
| 2,363,373 | Werner | Nov. 21, 1944 |
| 2,435,343 | Downey | Feb. 3, 1948 |
| 2,479,072 | Lee | Aug. 16, 1949 |
| 2,605,358 | Neher | July 29, 1952 |
| 2,651,762 | Snow | Sept. 8, 1953 |
| 2,721,474 | Phelps | Oct. 25, 1955 |
| 2,754,678 | Stinger | July 17, 1956 |
| 2,766,583 | Schirmer | Oct. 16, 1956 |
| 2,776,560 | Erath et al. | Jan. 8, 1957 |

FOREIGN PATENTS

| | | |
|---|---|---|
| 620,318 | Great Britain | Mar. 23, 1949 |